United States Patent Office 3,646,187
Patented Feb. 29, 1972

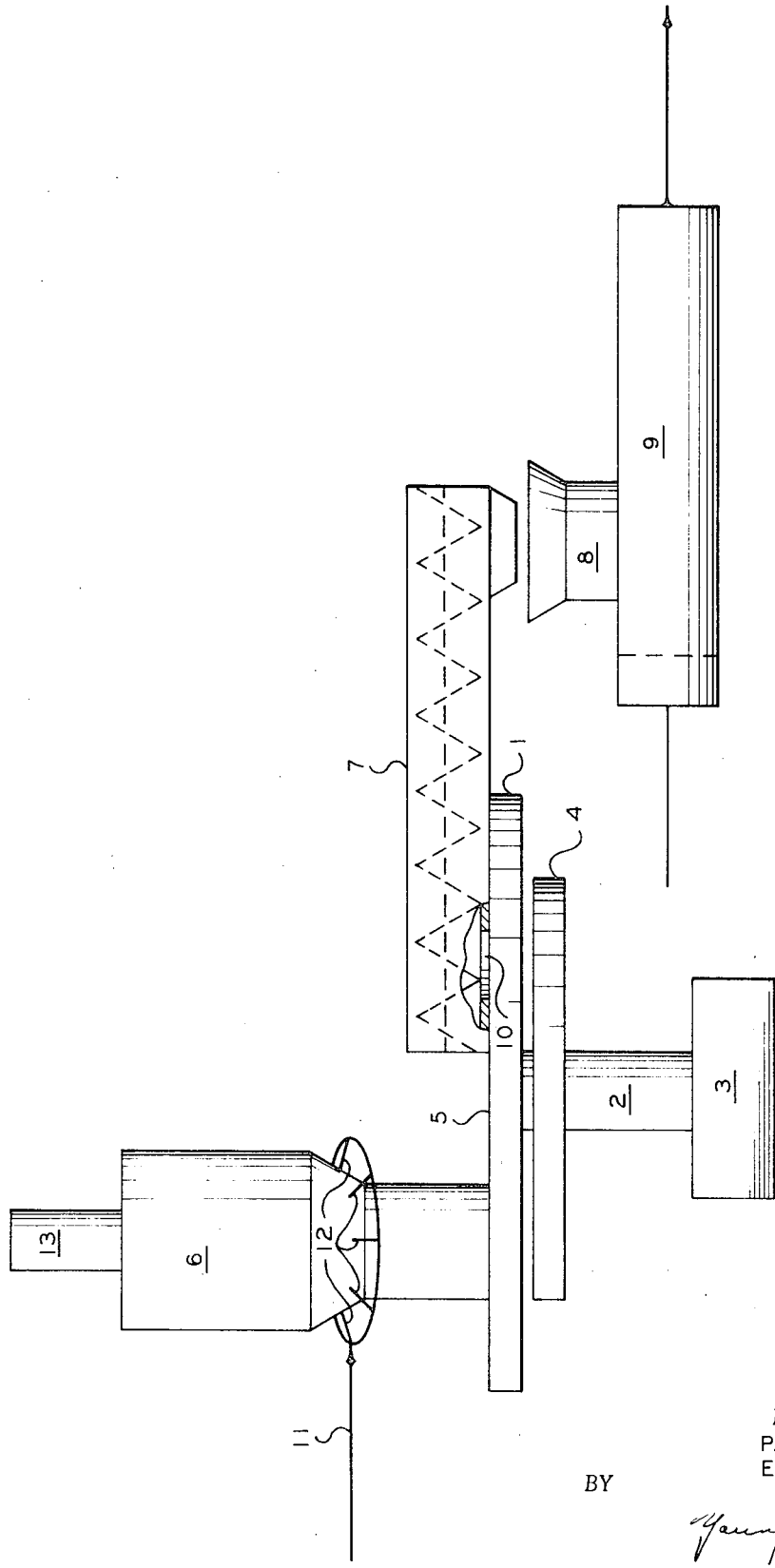

3,646,187
POLYMER PROCESSING
Paul B. Milam, Jr., and Edward C. Held, Jr., Bartlesville, Okla., assignors to Phillips Petroleum Company
Filed June 12, 1969, Ser. No. 832,728
Int. Cl. B28b 3/20; B29f 3/08
U.S. Cl. 264—176
8 Claims

ABSTRACT OF THE DISCLOSURE

A method and apparatus are disclosed for preheating a thermoplastic material to a temperature at which the thermoplastic flows unimpededly prior to its final heating before being introduced into an extruder.

---

This invention relates to polymer processing.

In one of its more specific aspects, this invention relates to the preheating of polymer subsequently processed in extruding devices.

Cellular thermoplastic products are conventionally produced by heating a plurality of pellets containing a blowing agent and introducing the heated pellets into an extruder from which they are extruded optionally in the presence of nucleating agents in such forms as may be desired.

Various apparatus are conventionally employed for heating the polymer prior to extrusion, this including heated turntables such as employed in U.S. Pat. 3,013,-298, to Engel, and other indirect heat exchange equipment such as conveyer belts or conveyer belts in conjunction with heated surfaces.

It is desirable to preheat the polymer pellets within comparatively narrow temperature ranges. If underheated, the pellets are not at the proper temperature when introduced into the second heating stage of the extruder and extruding is difficult. If overheated, the pellets tend to agglomerate prior to being conveyed into the extruder-heater and to objectionably adhere to the feed equipment.

The method and apparatus of this invention are directed to alleviating these difficulties. According to the method of this invention there is provided in the process for working thermoplastic materials in which a thermoplastic material is heated to a workable state, introduced into extruder means, and extruded in a desired shape, the improvement comprising heating the thermoplastic material in a first heating step to a temperature just less than the temperature at which it becomes tacky and heating the thermoplastic material in a second heating step to a temperature at which the thermoplastic material becomes melted and introducing said thermoplastic material into the extruder means.

According to the invention there is also provided an apparatus for processing polymeric materials comprising apparatus for heating the thermoplastic and apparatus for introducing the heated thermoplastic into an extruder, the improvement comprising storage means positioned to discharge thermoplastic material in contact with heating means, said storage means being adapted for the preliminary heating of the thermoplastic.

In one of its principal embodiments, the method and apparatus are adapted for employment in conjunction with that process and apparatus described in the aforementioned Pat. 3,013,298, known as the Engel process and apparatus in which a thermoplastic material is heated in a single step heating device to bring it to the required consistency for moulding and is then fed into moulds or dies by a separate conveying device, the materials having been first brought into a plastic or viscous state in the heating device after which the heated material is fed either directly or indirectly through a collecting receptacle in which it remains for a short period, and then to a device for conveyance to the shaping mechanism.

The process of this invention is carried out employing a heated rotary turntable, a feed hopper adapted to discharge onto the turntable and means for removing the heated polymer from the turntable into a conveyer for introduction into an extruder, the improvement comprising adapting the feed hopper for introduction of a hot gaseous fluid for heating the thermoplastic contained therein prior to its discharge onto the turntable.

In its preferred embodiment, this invention contemplates a dual stage heating process for bringing the polymeric material up to that processing temperature at which it is introduced into an extruder. As a result of the inclusion of the first stage heating step, the second stage heating step is considerably shortened and the residence time of the polymer therein is minimized. Accordingly, since the amount of heat supplied by the second stage heating step is reduced, the length of contact between the polymer and the heating surface, for example, the turntable, is shortened with the result that the charge capacity of the unit is appreciably increased.

Accordingly, it is an object of this invention to increase the charge capacity of any polymerization extrusion process which requires preliminary heating of the polymer.

It is another object of this invention to provide a more uniformly extruded polymeric product.

These and other objects and advantages of the method and apparatus of this invention will be evident from the following discussion in reference to the attached drawing.

Referring to the attached drawing, there is shown that embodiment of this invention in which the method and apparatus of this invention are applied in modification of a conventional extruding process in which the thermoplastic materials are introduced into the extruder from a heated turntable. The invention is not intended to be limited to this embodiment inasuch as any suitable second step heating means can be employed.

Turntable 1 is mounted on vertical shaft 2 and is rotatable in a horizontal plane by drive means 3. Mounted below turntable 1 is heat-producing means 4 from which heat is transferred to the upper surface 5 of turntable 1. Mounted above turntable 1 and feeding onto its upper surface 5 is hopper 6. Turntable 5 is adapted for removal of polymer pellets from its surface through opening 10 into conveyor 7 from which the polymer particles are fed through entrance 8 to the conveying device 9 for feeding to an extrusion die or mold.

Hopper 6 is of any size and configuration and discharges onto upper surface 5 of turntable 1. It is adapted with conduits 12 which open into hopper 6 at points around its periphery, preferably in its lower region. Conduits 12 communicate with header 11 from which that medium employed for heating the pellets in hopper 6 is discharged through conduits 12 into hopper 6 into contact with the pellets contained therein. Hopper 6 is adapted with stack 13 for venting the gaseous heating fluid after contact with the pellets and will be advantageously insulated.

Any gaseous fluid such as air, nitrogen, flue gas, superheated steam, and the like, can be employed for heating the pellets. Preferably the temperature of the gaseous fluid will be less than that temperature at which the particulate polymer begins to agglomerate. Inasmuch as the various polymers have various temperatures at which they exhibit degrees of cohesiveness and fluidity, none of which stages is specifically definable, for the purpose of this discussion, polymer particles will be considered, upon heating, as progressing through a warm temperature to a temperature at which they become tacky. Upon continued heating, the particles reach a temperature at which they tend to agglomerate and, thereafter, the particles reach a temperature at which they become melted. For purposes of this discussion, the first stage gaseous fluid convection step will be considered as heating the particles to a warm temperature, just less than that temperature of the tacky state, while the second stage conduction heating step will be considered as heating the particles to a temperature just beyond the melted state at which temperature they are introduced into the conveyor or extruder.

Any quantity of gaseous fluid needed for bringing the particles to the temperature desired and maintaining the particles at that temperature can be employed. If the temperature of the gaseous fluid is maintained below that temperature at which the particulate polymer begins to agglomerate or become tacky, the danger of obstructing flow from the hopper by overheating the particulate polymer will be avoided.

The gaseous fluid can be introduced at as many points as desired into hopper 6 through conduits 12. The use of a multiplicity of points insures more uniform heating of the particles.

Any velocity of introduction of the gaseous fluid into hopper 6 can be employed. While sufficient velocities can be employed to agitate the bed, this is unnecessary since diffusion of the gaseous fluid through the bed will heat the particles uniformly over their surface without agitation.

In the practice of the method of this invention, preheating will shorten the residence time of the preheated particle on the turntable. Accordingly, the speed of the turntable can be increased considerably and the overall capacity of the unit increased.

As previously stated, the particular temperature to which the various polymers are heated in each of the two stages varies with the individual polymer concerned. However, the following examples indicate temperature ranges for each of the two stages for the specific polymers involved. In each example, the polymer was heated in a first stage convection section and in a second stage conduction step over the temperature ranges indicated. Heating in the first stage was done by means of hot air; heating in the second stage was done by contact with a hot turntable. Temperature ranges were as follows:

| Polymer | First stage temperature range, °F. | Second stage temperature range, °F. |
|---|---|---|
| Polyethylene: | Ambient to: | |
| Density 0.90–0.92 | 145 | 145–175 |
| Density 0.95–0.96 | 185 | 185–210 |
| Polypropylene | 205 | 205–240 |

In the practice of the invention as set forth in the first instance above, the capacity of the unit was increased about 115 percent above that maximum capacity previously obtained in operation in the absence of the practice of this invention.

It will be evident from the above that modifications and changes can be made to the invention as disclosed herein. However such is considered as being within the scope of the invention.

What is claimed is:

1. A process for preheating a particulate thermoplastic polymeric material to a workable state prior to an extrusion step which comprises heating the particulate material in a first heating step to a temperature just less than that temperature at which said thermoplasic material becomes tacky by passing a hot gaseous fluid in contact with said particulate material and heating the heated thermoplastic material in a second heating step to a temperature at which the thermoplastic material becomes melted and introducing said thermoplastic material into said extrusion step.

2. The method as defined in claim 1 in which the thermoplastic is heated in said first heating step by convection and in said second heating step by conduction.

3. The method as defined in claim 1 in which the tempreature of said hot gaseous fluid is maintained at a temperature less than the temperature at which said thermoplastic material begins to agglomerate.

4. The method as defined in claim 1 in which the gaseous fluid is air.

5. The method of claim 1 in which polyethylene having a density within the range of about 0.90 to about 0.96 is heated in said first heating step by contacting said polyethylene with a hot gaseous fluid selected from the group consisting of nitrogen and flue gas, said polyethylene being retained in a hopper during said heating, said gaseous fluid being introduced into said hopper at a plurality of loci and at a velocity sufficient to agitate said polyethylene and said second heating step comprises contacting the heated polyethylene from said hopper with a heated turntable, said turntable discharging said polyethylene into said extrusion step.

6. The method of claim 5 in which said polyethylene is heated to a temperature within the range of about 145° F. to about 185° F. in said hopper and to a temperature within the range of about 145° F. to about 210° F. by contact with said turntable.

7. The method of claim 1 in which polypropylene is heated in a first heating step by contacting said polypropylene with a hot gaseous fluid selected from the group consisting of nitrogen and flue gas, said polypropylene being retained in a hopper during said heating, said gaseous fluid being introduced into said hopper at a plurality of loci and at a velocity sufficient to agitate said polypropylene and said second heating step comprises contacting the heated polyethylene from said hopper with a heated turntable, said turntable discharging said polyethylene into said extrusion step.

8. The method of claim 7 in which said polypropylene is heated to a temperature of about 205° F. in said hopper and to a temperature within the range of about 205° F. to about 240° F. by contact with said turntable.

References Cited

UNITED STATES PATENTS

| | | | |
|---|---|---|---|
| 3,013,298 | 12/1961 | Engel | 18—12 SH |
| 3,035,303 | 5/1962 | Stanley | 264—349 |
| 3,036,335 | 5/1962 | Heston et al. | 264—176 |
| 3,262,154 | 7/1966 | Valyi | 264—349 |
| 3,480,596 | 11/1969 | Simons | 264—176 Z |

FOREIGN PATENTS

| | | | |
|---|---|---|---|
| 1,008,429 | 10/1965 | Great Britain | 264—Preheat Dig. |
| 30,012 | 12/1968 | Japan | 264—176 Z |
| 143,225 | 5/1960 | Russia | 264—176 Z |

JAY H. WOO, Primary Examiner

U.S. Cl. X.R.

18—12 SH, 12 SP; 264—329